(12) United States Patent
Yu et al.

(10) Patent No.: US 10,613,245 B2
(45) Date of Patent: Apr. 7, 2020

(54) MINE TEM THREE-COMPONENT DETECTION METHOD

(71) Applicant: China University of Mining and Technology, Xuzhou, Jiangsu (CN)

(72) Inventors: Jingcun Yu, Jiangsu (CN); Benyu Su, Jiangsu (CN); Jianghao Chang, Jiangsu (CN)

(73) Assignee: China University of Mining and Technology, Xuzhou, Jiangsu (CN)

( * ) Notice: Subject to any disclaimer, the term of this patent is extended or adjusted under 35 U.S.C. 154(b) by 0 days.

(21) Appl. No.: 16/092,392

(22) PCT Filed: Nov. 28, 2017

(86) PCT No.: PCT/CN2017/113275
§ 371 (c)(1),
(2) Date: Oct. 9, 2018

(87) PCT Pub. No.: WO2018/107959
PCT Pub. Date: Jun. 21, 2018

(65) Prior Publication Data
US 2019/0339413 A1    Nov. 7, 2019

(30) Foreign Application Priority Data
Dec. 14, 2016    (CN) .......................... 2016 1 1154324

(51) Int. Cl.
*G01V 3/28* (2006.01)
*G01V 3/30* (2006.01)
*G01V 99/00* (2009.01)

(52) U.S. Cl.
CPC .................. *G01V 3/28* (2013.01); *G01V 3/30* (2013.01); *G01V 99/005* (2013.01)

(58) Field of Classification Search
CPC ....................................................... G01V 3/28
See application file for complete search history.

(56) References Cited

U.S. PATENT DOCUMENTS

2014/0121974 A1   5/2014 Itskovich
2016/0223703 A1*  8/2016 Wu ........................... G01V 3/30

FOREIGN PATENT DOCUMENTS

CN    103472487 A    12/2013
CN    104330832 A     2/2015
(Continued)

*Primary Examiner* — Manuel A Rivera Vargas
(74) *Attorney, Agent, or Firm* — Seed IP Law Group LLP

(57) ABSTRACT

The present disclosure discloses a mine transient electromagnetic (TEM) three-component detection method. TEM transmitting coils and receiving coils are adjusted according to geological features in a coal mine. Depending on different measurement manners, the number of magnetic-field lines cut by a low-resistance body greatly varies, and thus the strength of the resulting secondary fields also greatly varies. The present disclosure uses three sets of receiving coils that are arranged perpendicular to each other. One of the three sets of receiving coils and a transmitting coil are arranged according to a coincident loop device, such that response data in all directions can be received from a single transmission. At an underground roadway head, fan shape scan is achieved by changing angles of the transmitting coil and the receiving coils, to obtain more electromagnetic responses, such that a water-rich region in the formation can be more accurately determined.

5 Claims, 10 Drawing Sheets

(56) References Cited

FOREIGN PATENT DOCUMENTS

| CN | 104597511 A | 5/2015 |
| CN | 205317861 U | 6/2016 |
| CN | 106054258 A | 10/2016 |
| CN | 106772644 A | 5/2017 |

* cited by examiner

MINE TEM THREE-COMPONENT DETECTION METHOD

BACKGROUND

Technical Field

The present disclosure relates to the field of applied geophysics, and in particular, to a mine transient electromagnetic (TEM) three-component detection method applied to advanced detection for electrically anisotropic geology in a mine roadway.

Description of the Related Art

A TEM technique has been widely used in prevention and control of water inrush in coal mines, which reduces the occurrence of water inrush accidents in the coal mines, reduces economic losses, and ensures the safety of people. The TEM technique has a broad development prospect, which is sensitive to low-resistance anomalies, and can find out water-containing geological bodies such as karst caves, tunnels, mined-out areas, deep irregular aquifers, and the like. The TEM technique can implement deep exploration; and has advantages such as sensitivity to low-resistance geological bodies, good coupling with a detected target, strong response to anomalies, simple form, strong discrimination, and the like. As coal mining proceeds deeply and longitudinally, geological conditions become relatively complicated, and the electrical anisotropy of the geology in the mine is serious. In this case, the TEM detection technique faces great challenge, because the TEM detection theory based on horizontally layered media determines the spatial location of the anomaly in front by detecting secondary field information of only one component.

The TEM method is also called time-domain electromagnetic method, which is a technique based on the theory for horizontally layered media. In this technique, a primary pulsed magnetic field is emitted into the earth using an ungrounded loop or ground source, and during an interval of emission of the magnetic field, a secondary turbulence field produced by the anomaly is observed using a coil or ground electrode. The change pattern of the secondary field as a function of time in multiple time periods after interruption of power supply is investigated, that is, the induced voltage is measured. Based on the electromagnetic field theory, the measured data is converted into information about formation depth and resistivity, to obtain geo-electrical features of the formation at different depth.

Due to the serious electrical anisotropy of the geology in the mine, the TEM detection technique based on the theory for horizontally layered media faces great challenge in advanced detection in a roadway.

Currently, advanced detection in mine roadways conducted according to the TEM is based on the theory for layered formation, and only the normal component of the heading face is measured. For electrically anisotropic formation, geological anomalies are determined only according to data about the normal component, resulting in a seriously wrong geological conclusion. For example, a fault fracture zone of a steep vertical fault is a good groundwater storage zone, and its model can be analogized according to the geo-electrical model FIG. 11. During the advanced detection for the vertical fault fracture zone, a primary field is hardly cut, and thus an induced secondary field is rather weak. It is rather difficult to infer, according to the weak secondary field, whether there is a low-resistance fault fracture zone ahead of the heading face.

BRIEF SUMMARY

Embodiments of the present invention overcome the shortcomings in the prior art, and provide a more comprehensive advanced detection method, which can be applied to electrically anisotropic geology in a mine. Specifically, an embodiment of the present invention provides a mine TEM three-component detection method that can accurately detect a spatial position of an anomaly.

In accordance with an embodiment of a mine TEM three-component detection method, a transmitting coil, three sets of receiving coils, a multi-channel TEM instrument, and a mine host are used, the multi-channel TEM instrument being connected to the transmitting coil and the receiving coils, and the transmitting coil and the receiving coils being connected to the mine host; characterized in that, the method includes: first performing forward modeling of various formations, and gathering and analyzing acquired mine TEM three-component responses; then, during actual measurement at an underground roadway head, acquiring TEM three-component data of the current roadway by using the receiving coils, comparing the acquired TEM three-component data of the current roadway with whole-space TEM three-component information of a front anomaly model, and processing and interpreting the data, to determine whether a plate-like anomaly exists ahead of a heading face, an attitude of the plate-like anomaly in the coal seam, and the size and position of the anomaly.

The step of performing forward modeling of various formations includes:

a. designing a uniform whole-space model, and performing numerical simulation of a response made by the model, to obtain a curve of a secondary induced voltage as a function of time;

b. designing a geo-electrical model containing the plate-like anomaly, and performing numerical simulations respectively of responses made when the plate-like anomaly is placed horizontally or vertically, to obtain multiple curves of the secondary induced voltage as a function of time that correspond to the different placement manners of the plate-like anomaly; comparing response curves of the vertically placed plate-like anomaly and the horizontally placed plate-like anomaly with a uniform whole-space curve, to summarize regular pattern data;

c. establishing a model of an anomaly located right ahead of a heading end, to show a position of the anomaly with respect to the tunneling; and performing three-component acquisition and fan-shaped arrangement of measurement points at the roadway head, to obtain a vertical component response and a horizontal component response, where different time profile curves of the vertical component response all present a single peak anomaly, and the fan-shapedly arranged measurement points in the roadway experience the strongest response in the direction of 90°, this direction corresponding to a detection direction right ahead of the heading end; the horizontal component response is a negative value in the directions of left-side detection angles, and is a positive value in the directions of right-side detection angles; a negative maximum value occurs at a measurement point in the direction of left-side 45°, and a positive maximum value occurs at a measurement point in the direction of right-side 45°; the horizontal component response in the direction of 90° is zero, because media on left and right sides of a transmitting coil are completely symmetrical when a transmission direction is just along the forward direction of the heading end and then horizontal responses of the media on the two sides cancel each other; a result obtained by comparison between the vertical component response and the horizontal component response shows that the horizontal component is more sensitive to the anomaly position and is more conducive to determining the position of the anomaly; and d. establishing a model of an anomaly with respect to sidewalls of the roadway head, and performing forward modeling to obtain a vertical component response and a horizontal component response of the model, where different time profile curves of the vertical component response all show that a maximum value occurs in the direction of right-side 45°, which accurately reflects the position of the anomaly; a horizontal component curve has two zero points where one is in the direction of left-side 45° and the other one is in the direction of right-side 45°, and the direction of right-side 45° corresponds to the position of the anomaly; when detection is performed at this angle, the media at the left side and right side about the transmitting coil are completely symmetrical, and therefore the horizontal component is zero; the direction of left-side 45° corresponds to a position where the vertical component is the lowest, and this transmission direction is completely orthogonal to the position of the anomaly; and in this case, an impact of the anomaly on a TEM field is minimal, and therefore the vertical component response and the horizontal component response are both weak; and comparing the result regarding the sidewalls of the heading end with the result regarding the direction right ahead of the heading end, where a change in a response result reflects a change of the position of the anomaly, and therefore integrated interpretation of the three components provide a new solution to locating the anomaly.

The step of actual measurement at an underground roadway head includes:

a. installing the transmitting coil and receiving coils at the heading end of the heading face in the measured roadway, starting a magnetic source emission device to emit a primary field pulse, and receiving a secondary field signal produced by the surrounding geological bodies with the three sets of receiving coils; and then the receiving coils feeding back an acquired signal to the mine host, and the mine host converting an analog signal into a digital signal and saving the digital signal, to obtain three-component information;

b. the mine host, as a TEM host, being connected to all receiving coils via cables, electromagnetic data fed back by the receiving coils, which express TEM secondary field information in the form of induced voltage, and dividing data about the TEM secondary field information into two sequences which are a time sequence and an induced voltage sequence; then, performing time-depth conversion on the time-sequence data from the multiple receiving coils to obtain detection depth, and converting the induced voltage into apparent resistivity to obtain a data set of [detection depth, apparent resistivity];

c. drawing an induced voltage-time curve showing that an induced electromotive force V changes with the time t in a bi-logarithmic coordinate system according to the obtained data set of [detection depth, apparent resistivity], where because propagation duration of an electromagnetic wave corresponds to the detection depth and the induced electromotive force reflects formation resistivity information, a variation trend of the induced voltage-time curve reflects variations of the formation resistivity with the increase of the depth, to obtain TEM three-component information about the measured roadway;

d. changing the position of the transmitting coil and repeating steps a to c, to obtain multiple induced voltage-time curves;

e. determining, based on the multiple induced voltage-time curves, whether a plate-like anomaly exists in a coal seam ahead of the heading face, and an attitude of the plate-like anomaly in the coal seam, which is specifically as follows:

when most of the drawn induced voltage-time curves show that the electromotive force V steadily decreases to zero with the time t, determining that the coal seam ahead of the heading face is a uniform medium and does not contain an anomaly;

when most of the drawn induced voltage-time curves show that the electromotive force V does not steadily decrease to zero with the time t, determining that the anomaly exists in the coal seam ahead of the heading face; and in this case, respectively drawing variation curves of the induced voltage of a secondary field in a horizontal direction and a vertical direction as a function of time;

when the drawn variation curves show that the electromotive force V decreases to zero with the time t, nonlinear attenuation occurs during the decrease, and the curves have convexity, determining that a vertical anomaly exists in the coal seam ahead of the heading face; or when the drawn variation curves show that the curves are ended before the electromotive force V decreasing to zero with the time t, and the curves have concavity and convexity during the decrease, determining that a vertical plate-like anomaly exists in the coal seam ahead of the heading face; and f. determining the size and position of the anomaly ahead of the heading face by using the multiple induced voltage-time curves and according to a simulation result of three-component numerical values regarding anomalies at different positions in various formation models, which is specifically as follows:

comparing a vertical component result with a theoretical curve, determining the resistivity character of the anomaly according to the amplitude of the curve, to determine its size; and comparing a horizontal component result with the theoretical curve, and determining the occurrence position of the anomaly more accurately according to the zero position of the curve.

The step of simulating the curves of the induced voltage as a function of time in a horizontal direction and a vertical direction includes:

I. simulating the numerical values of the induced voltages to obtain data, and using logarithmic coordinates for all the data, to obtain multiple logarithmic curves of the data sets of [detection depth, apparent resistivity]; and II. performing apparent resistivity conversion or resistivity inversion for components of all directions, to obtain geo-electrical information in different directions, and interpreting the geological bodies according to the obtained geo-electrical information.

The transmitting coil and the three sets of receiving coils are different in the number of turns, the number of turns of the transmitting coil being 40 while the number of turns of the receiving coil in each set being 60, where the transmitting coil is disposed along a normal to a heading end of a heading face; the three sets of receiving coils are arranged perpendicular to each other, one of the three sets of receiving coils having the same direction with the transmitting coil and being arranged with a coincident loop device, and the other two sets being respectively leveled vertically and horizontally about a tangent line of the heading end, such that response data of all directions can be received from a single transmission.

The transmitting coil and the receiving coils are disposed on the underground roadway head, fan shape scan is performed by changing angles of the transmitting coil and the receiving coils, and a secondary electromagnetic response to an anomaly is detected in three directions, to attain more electromagnetic responses, such that a water-rich region in the formation can be more accurately determined.

Beneficial effects: In the foregoing technical solutions, a transmitting coil and receiving coils for three directions are disposed on a heading face according to the geological features, an electromagnetic component of a secondary field is measured in three directions at the same time, and the obtained three-component data is synthetically processed and interpreted, thus effectively determining whether an anomaly exists in a coal seam ahead of the heading face, and accurately determining the spatial position of the anomaly. As such, a new geophysical detection method is provided for mine advanced detection.

After three-component information of the anomaly is obtained by use of an embodiment of the present invention, the spatial position of the anomaly can be accurately detected. By changing the positions of the transmitting coil and the receiving coils, the electromagnetic component information of the secondary field can be acquired in three directions for many times, thus overcoming the shortcomings of single-component measurement in the prior art. Thus, embodiments of the present invention are highly reliable, and can be applied to complicated geological conditions in the mine, which not only can detect whether the formation outside the roadway contains an anomaly, but also can determine a rough three-dimensional structure of the anomaly. Especially, for the vertical fault fracture zone and the collapse column with vertical occurrence, the mine TEM three-component data is integrated to perform interpretation, which can reduce the multiplicity of solutions. Thus, comprehensive, accurate, and reliable geophysical data can be provided for mine geological detection.

DETAILED DESCRIPTION

Figure 1:
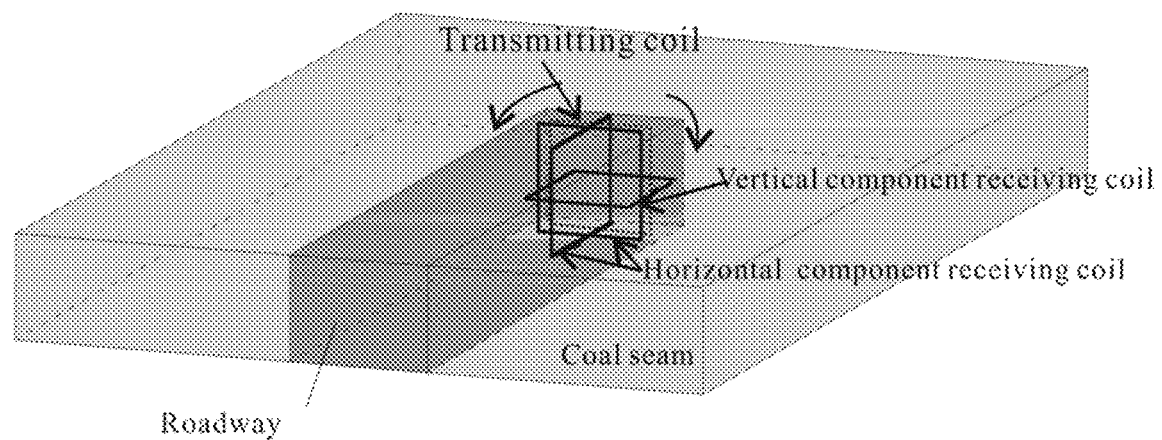
FIG. 1 is a schematic diagram showing settings for underground three-component detection according to an embodiment of the present invention.
Figure 2:
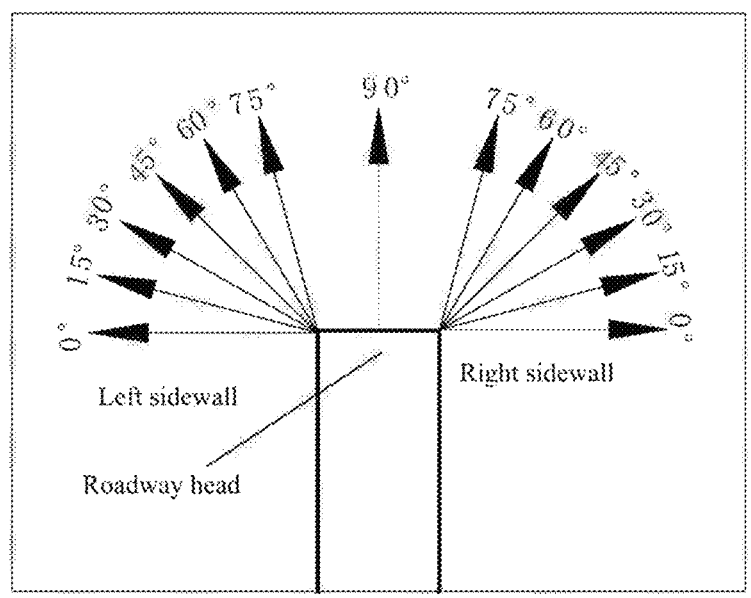
FIG. 2 is a schematic diagram showing fan-shaped detection information at a roadway head according to an embodiment of the present invention.
Figure 3:
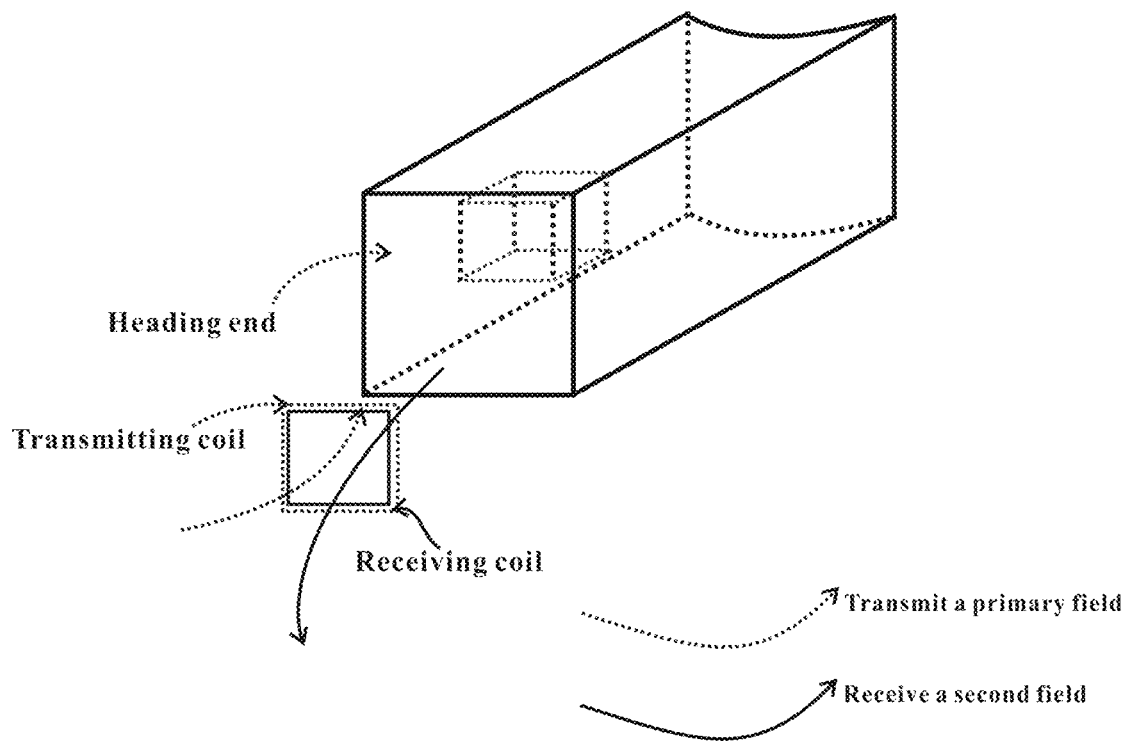
FIG. 3 is a schematic diagram showing that vertical overlapping coils receive a TEM response perpendicular to a heading end according to an embodiment of the present invention.
Figure 4:
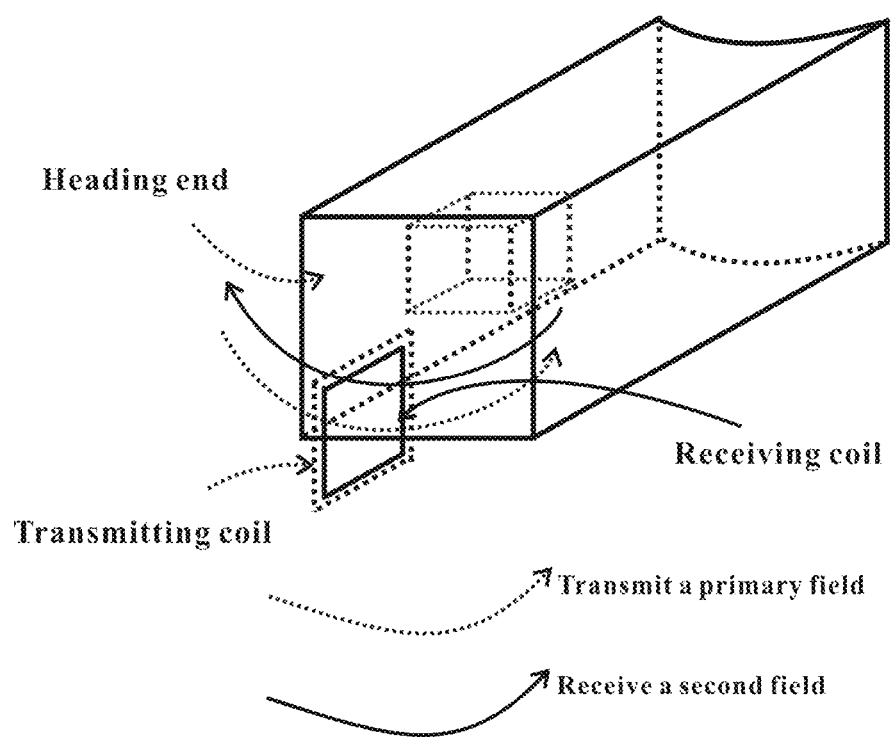
FIG. 4 is a schematic diagram showing that horizontally leveled overlapping coils receive a TEM secondary-field component parallel to a heading end according to an embodiment of the present invention.
Figure 5:
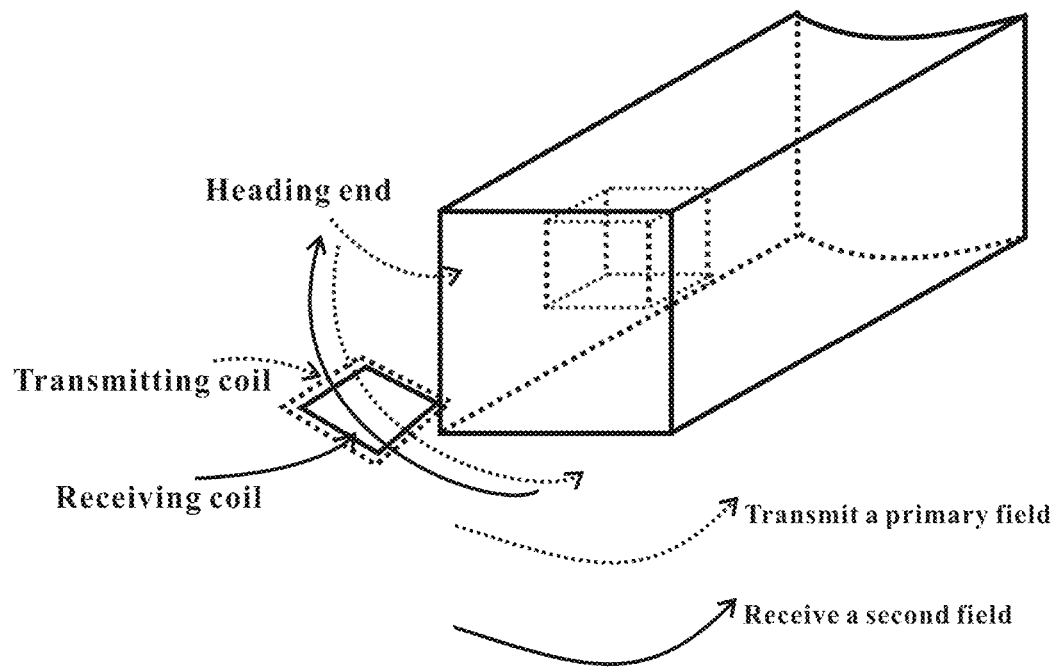
FIG. 5 is a schematic diagram showing that vertically leveled overlapping coils receive a TEM secondary-field component parallel to a heading end according to an embodiment of the present invention.
Figure 6:
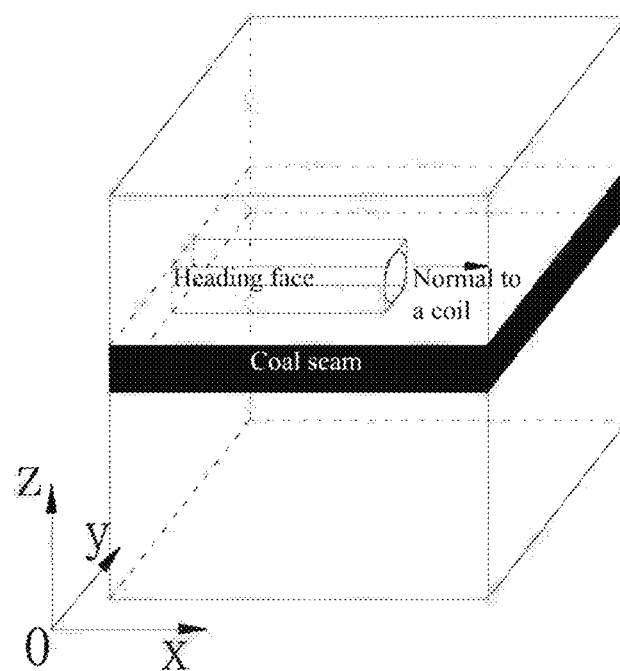
FIG. 6 is a schematic diagram of a three-dimensional model of a three-component detection coil according to an embodiment of the present invention.
Figure 7:
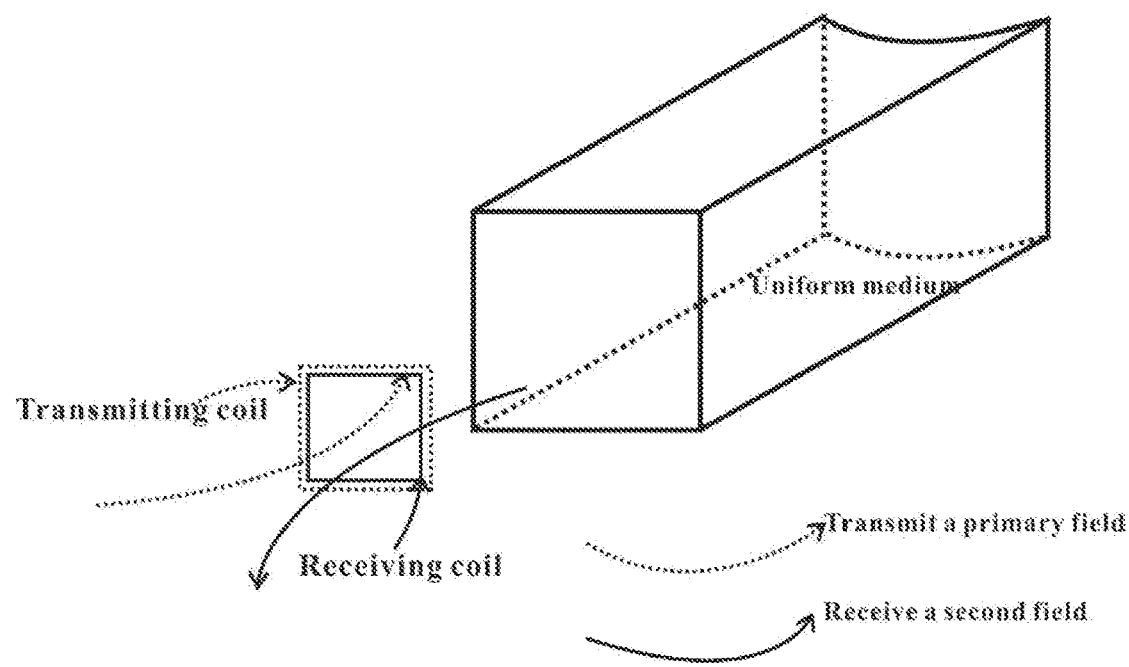
FIG. 7 is a schematic diagram of a mine geo-electric model designed based on a uniform-medium model, and advanced detection according to an embodiment of the present invention.
Figure 8:
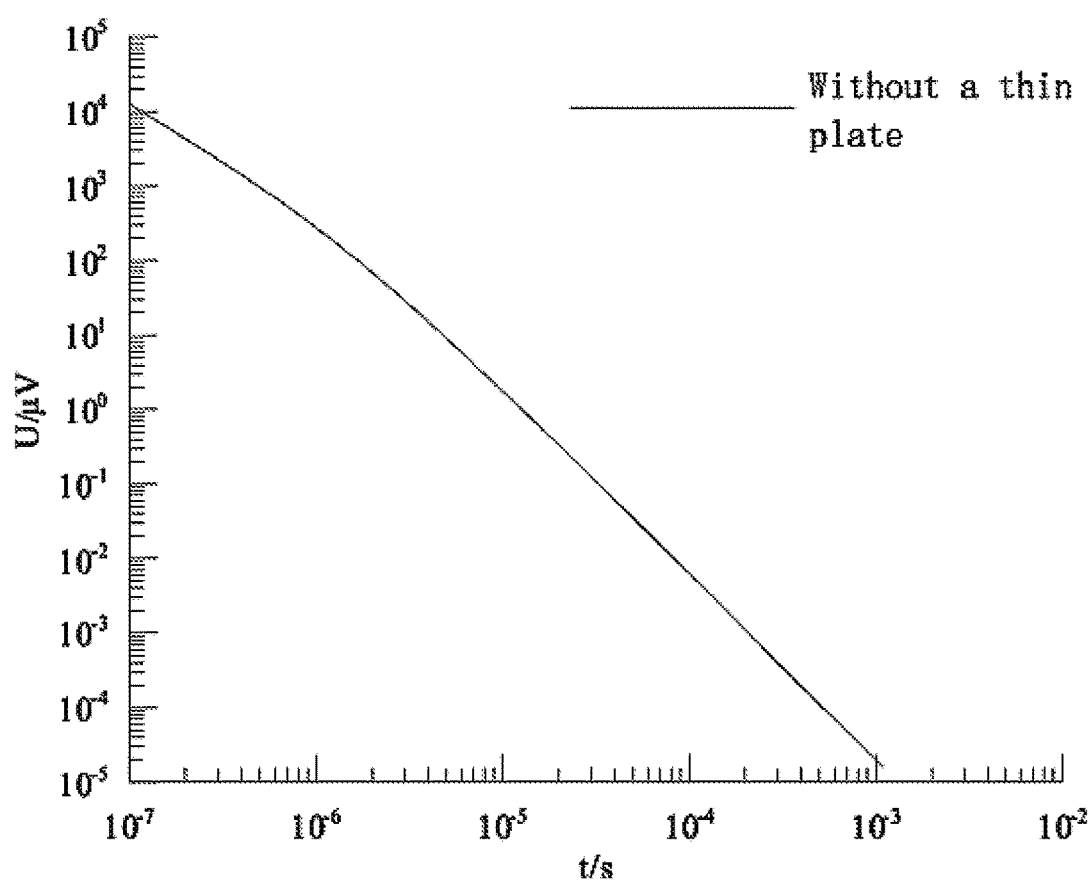
FIG. 8 is a schematic diagram of an induced voltage-time curve obtained through advanced detection using the mine geo-electric model designed based on a uniform-medium model according to an embodiment of the present invention.
Figure 9:
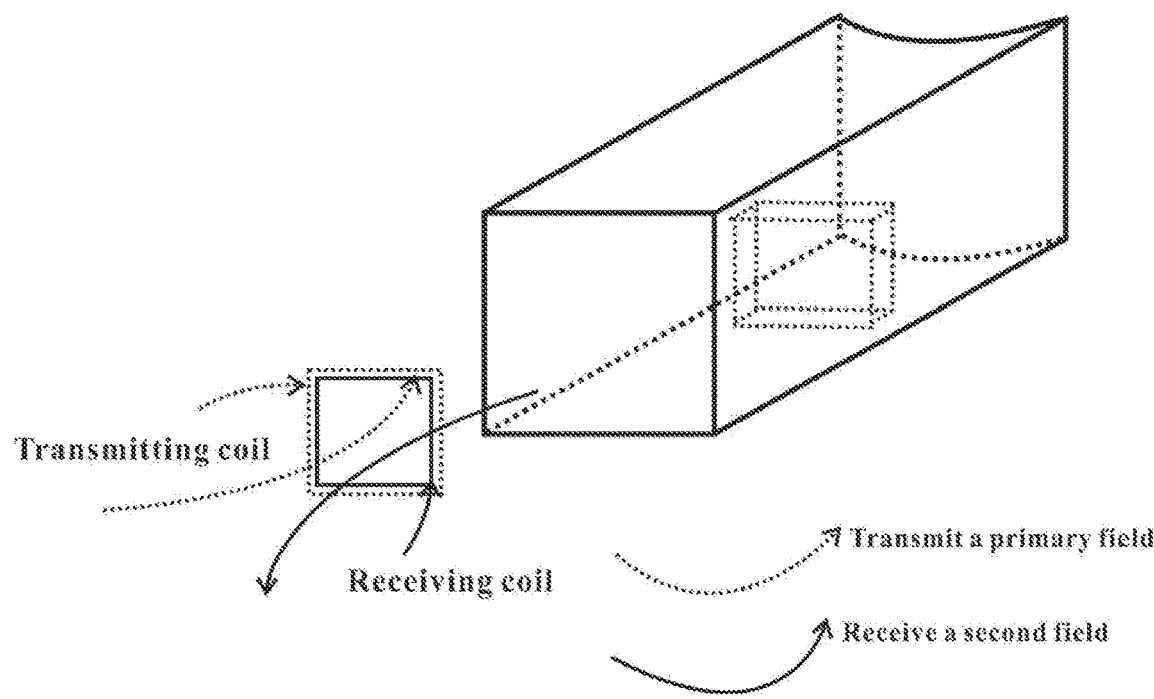
FIG. 9 is a schematic diagram of a mine advanced geo-electrical model containing a vertical plate-like anomaly according to an embodiment of the present invention.
Figure 10:
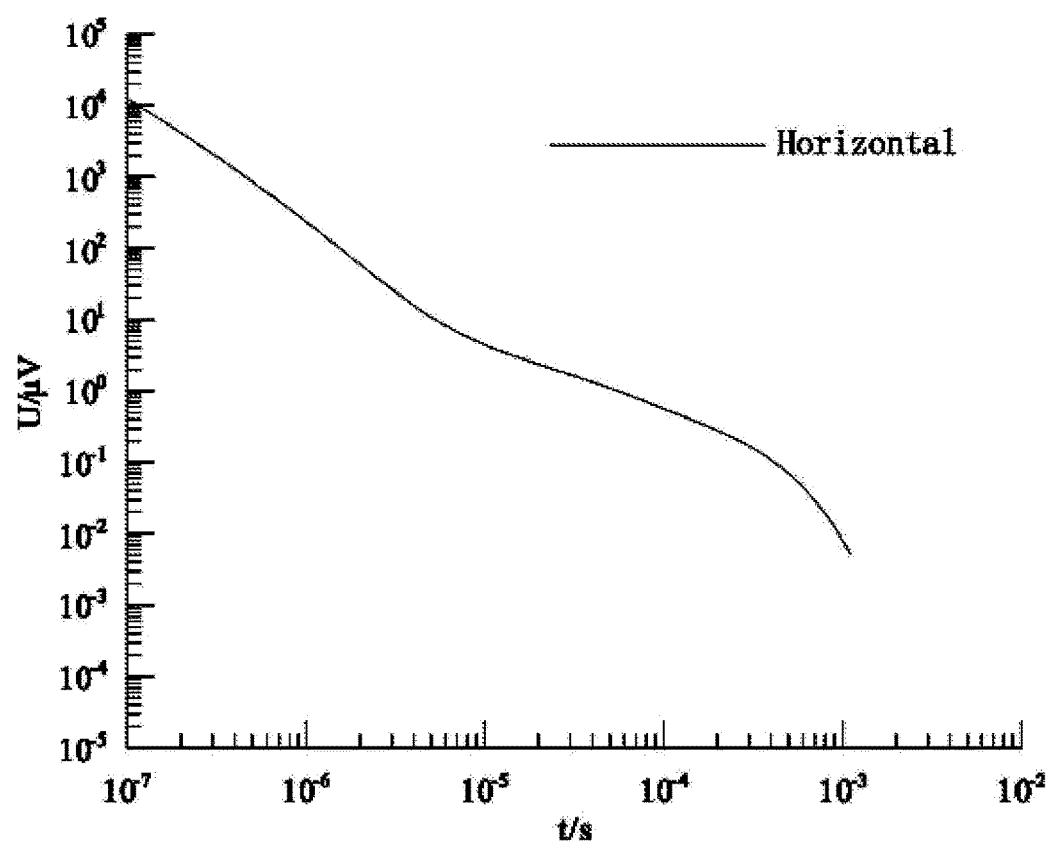
FIG. 10 is a schematic diagram of an induced voltage-time curve obtained through advanced detection using the mine advanced geo-electric model containing the vertical plate-like anomaly according to an embodiment of the present invention.
Figure 11:
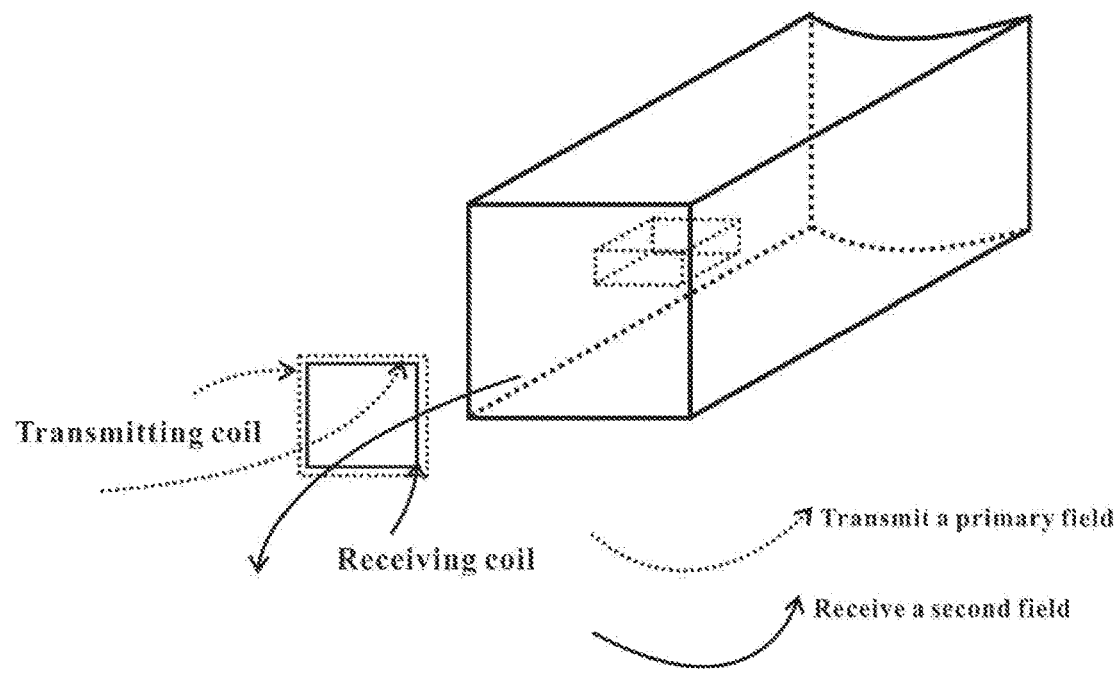
FIG. 11 is a schematic diagram of a mine advanced geo-electrical model containing a horizontal plate-like anomaly according to an embodiment of the present invention.
Figure 12:
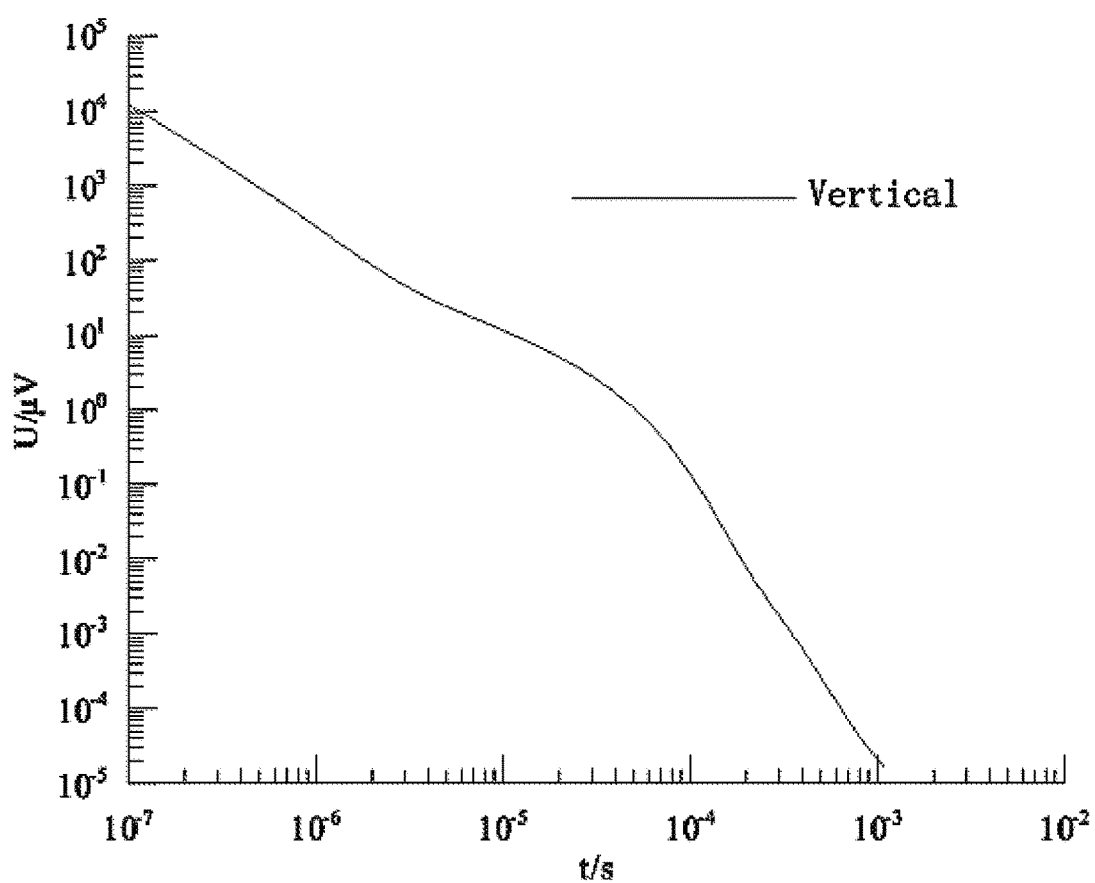
FIG. 12 is a schematic diagram of an induced voltage-time curve obtained through advanced detection using the mine advanced geo-electric model containing the horizontal plate-like anomaly according to an embodiment of the present invention.
Figure 13:
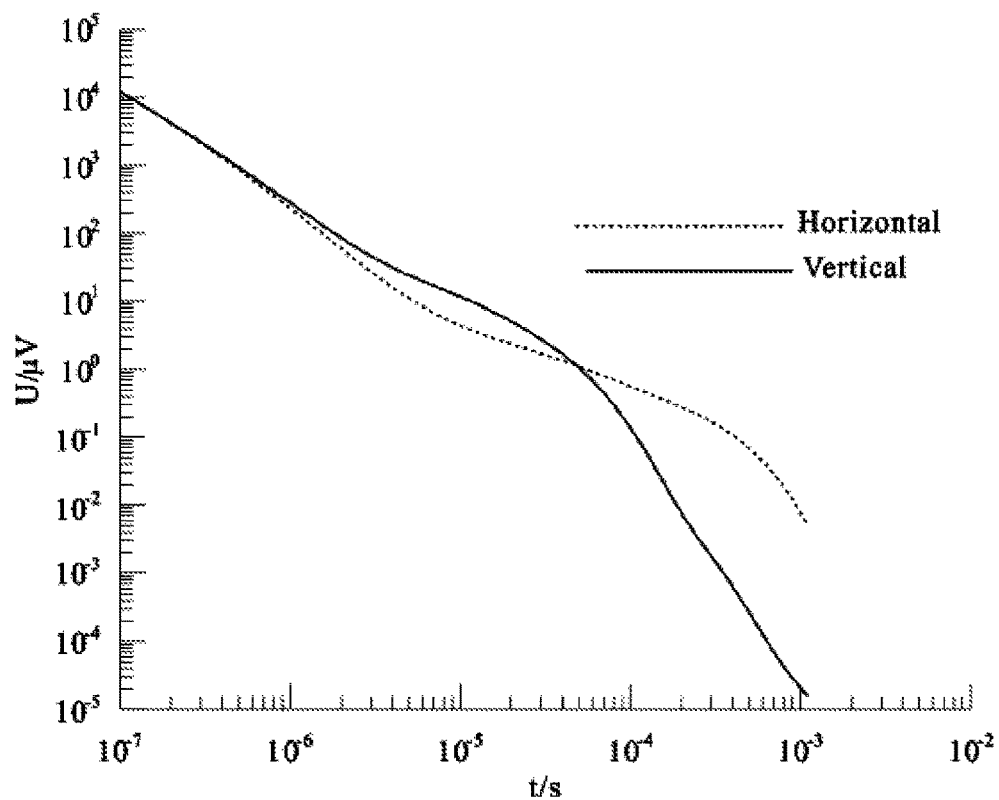
FIG. 13 is a schematic diagram showing comparison between the induced voltage-time curve obtained through advanced detection using the mine advanced geo-electric model containing the horizontal plate-like anomaly and the induced voltage-time curve obtained through advanced detection using the mine advanced geo-electric model containing the vertical plate-like anomaly.
Figure 14:
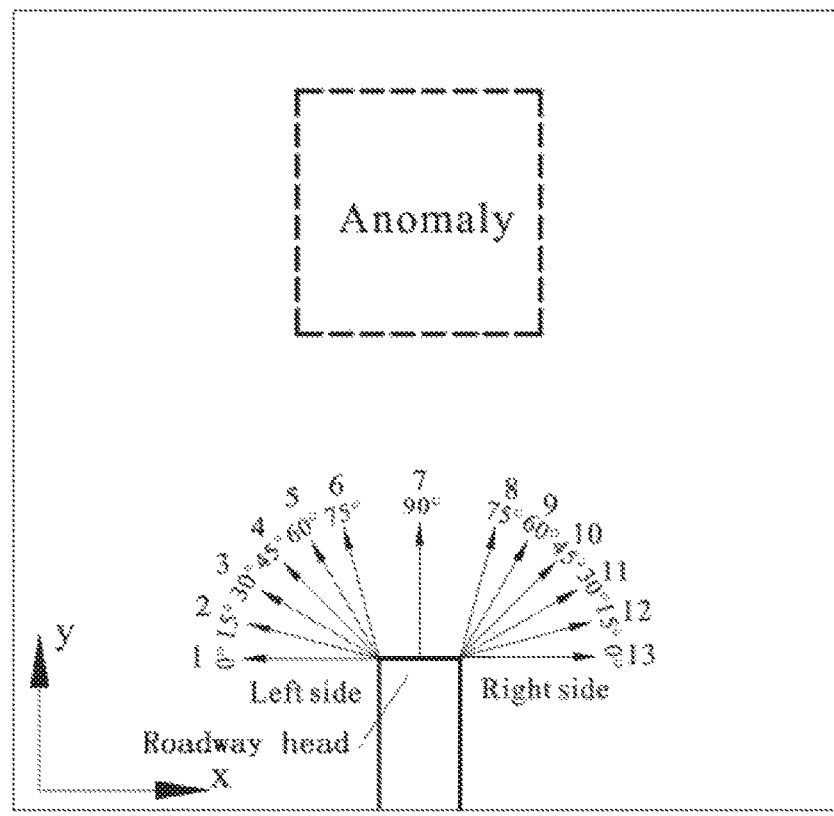
FIG. 14 is a schematic diagram of a model showing that an anomaly is located right ahead of a heading end according to an embodiment of the present invention.
Figure 15A:
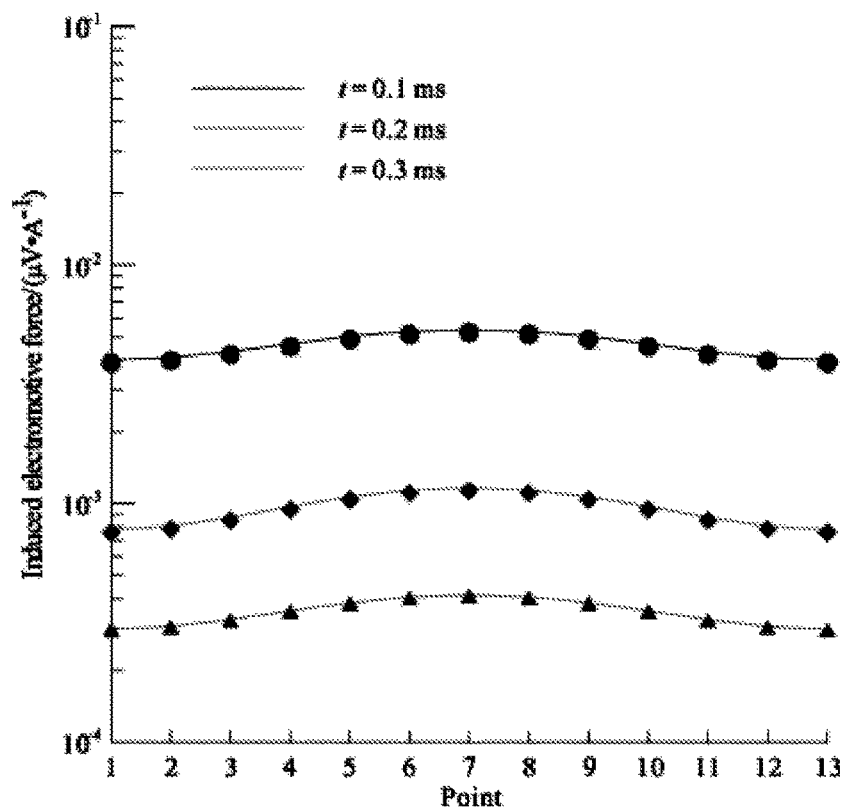
FIG. 15(a) is a schematic diagram showing features of a vertical component response to a front anomaly according to an embodiment of the present invention.
Figure 15B:
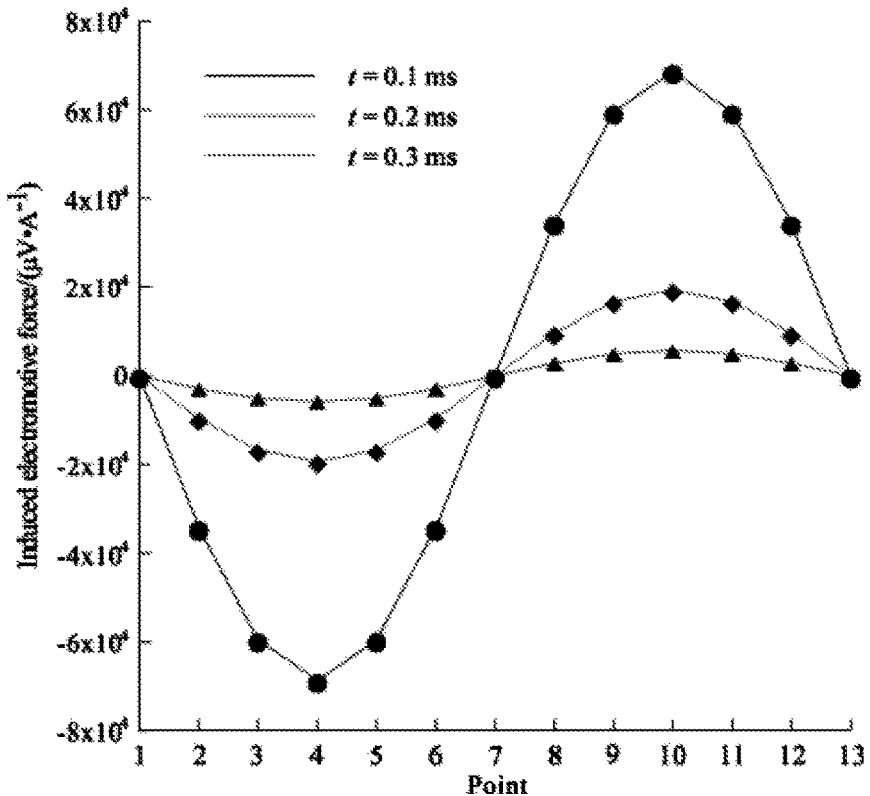
FIG. 15(b) is a schematic diagram showing features of a vertical component response to the anomaly in front according to an embodiment of the present invention.
Figure 16:
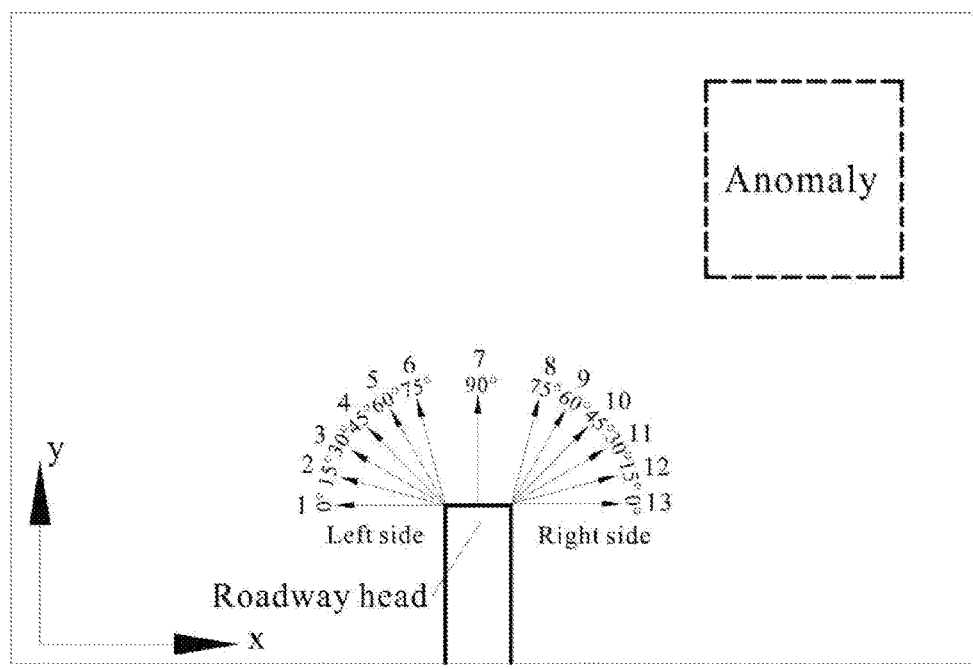
FIG. 16 is a schematic diagram of a model showing that an anomaly is located in a right sidewall about a heading end according to an embodiment of the present invention.
Figure 17A:
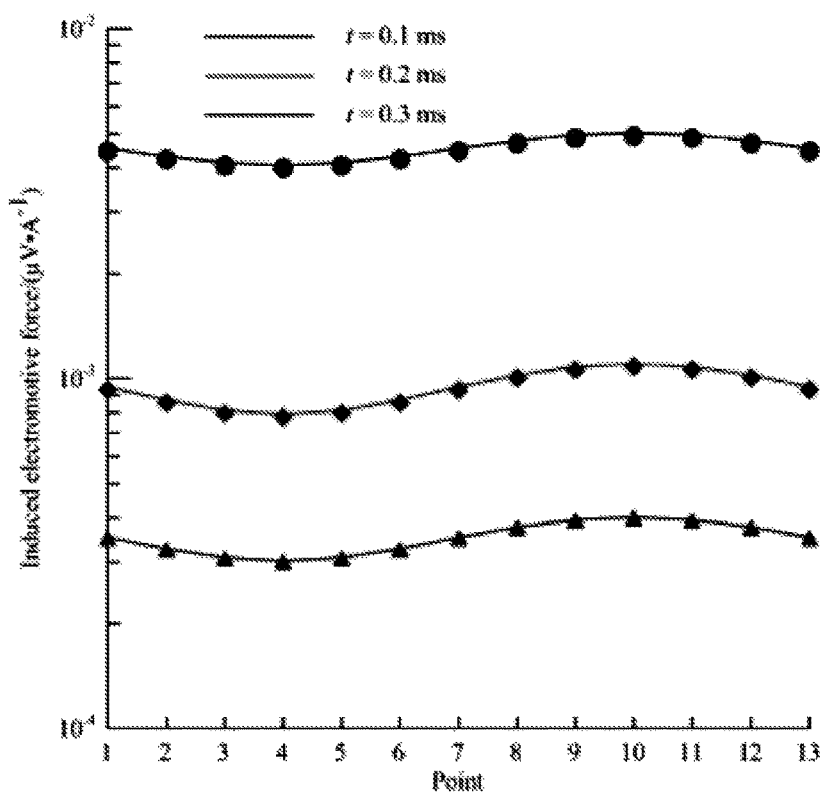
FIG. 17(a) is a schematic diagram showing features of a vertical component response to the anomaly in a right sidewall according to an embodiment of the present invention.
Figure 17B:
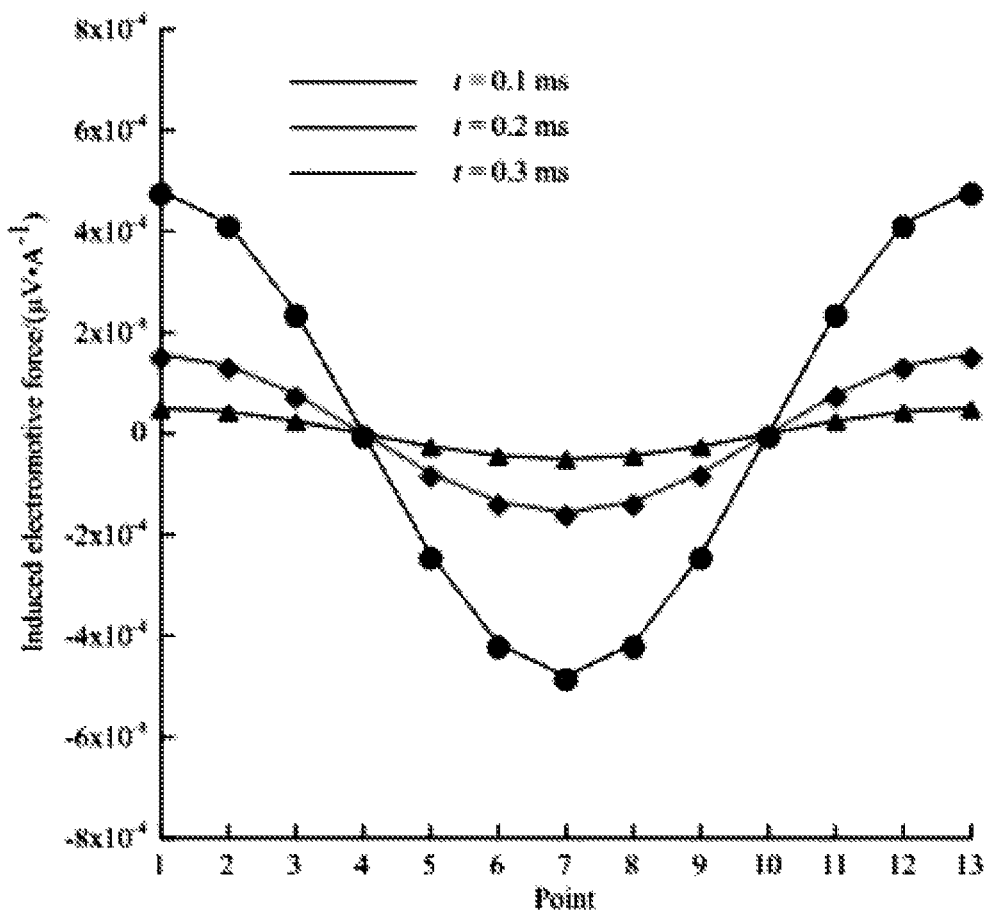
FIG. 17(b) is a schematic diagram showing features of a vertical component response to the anomaly in a right sidewall according to an embodiment of the present invention.
Figure 18:
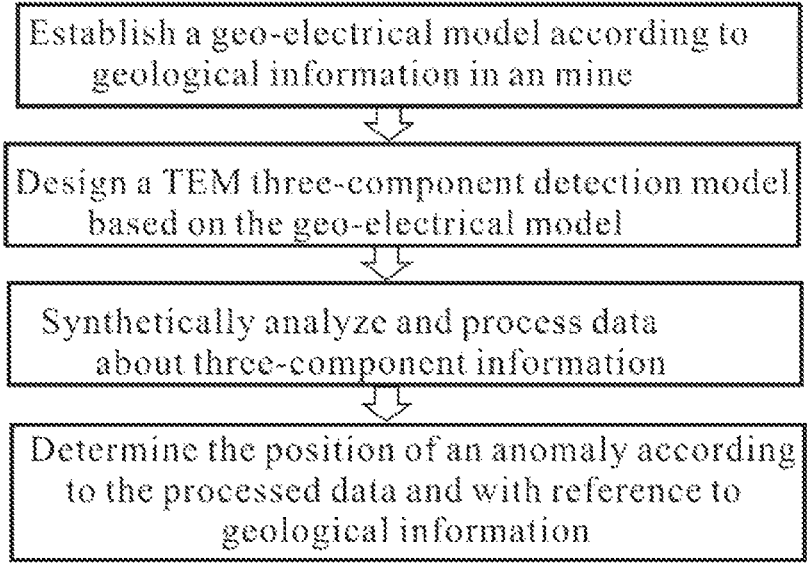
FIG. 18 is a schematic flowchart of three-component detection according to an embodiment of the present invention.

As shown in FIG. 1, in a mine TEM three-component detection method of an embodiment of the present invention, the transmitting coil, three sets of receiving coils, a multi-channel TEM instrument connected to the transmitting coil and the receiving coils are used, where the transmitting coil and the receiving coils are connected to a mine host. The transmitting coil and the three sets of receiving coils are different in the number of turns, where the number of turns of the transmitting coil is 40, while the number of turns of the receiving coil in each set is 60. A transmitting coil is disposed along a normal to a heading end of a heading face. The three sets of receiving coils are arranged perpendicular to each other, where one of the three sets of receiving coils has the same direction with the transmitting coil and arranged with a coincident loop device, and the other two sets are respectively leveled vertically and horizontally about a tangent line of the heading end, such that response data of all directions can be received from a single transmission. The three-component detection method specifically includes the following steps:

1. Forward modeling is performed for various formation models according to parameters of an actual formation where the underground heading face is in, and acquired mine TEM three-component responses are gathered and analyzed. Specific steps are as follows:
   a. A uniform whole-space model is designed, and numerical simulation is performed for a response made by the model, to obtain a curve of a secondary induced voltage as a function of time.
   b. A geo-electrical model containing a plate-like anomaly is designed, and numerical simulations are performed for responses made when the plate-like anomaly is placed horizontally or vertically, to obtain multiple curves of the secondary induced voltage as a function of time that correspond to the different placement manners of the plate-like anomaly; response curves of the vertically placed plate-like anomaly and the horizontally placed plate-like anomaly are compared with a uniform whole-space curve, to summarize a regular pattern.
   c. As shown in FIG. 14, a model of an anomaly located right ahead of a heading end is established, to show a position of the anomaly with respect to the tunneling; and three-component acquisition shown in FIG. 1 and fan-shaped arrangement of measurement points shown in FIG. 2 are performed at the roadway head, to obtain a vertical component response and a horizontal component response (FIGS. 15(*a*) and 15(*b*)). As shown in FIGS. 15(*a*) and 15(*b*), different time profile curves of the vertical component response all present a single peak anomaly, and the response to the anomaly becomes the strongest in the direction of 90° in the roadway shown in FIG. 2, where this direction corresponds to a detection direction right ahead of the heading end. The horizontal component response (FIG. 15(*b*)) is a negative value in the directions of left-side detection angles, and is a positive value in the directions of right-side detection angles. As shown in FIG. 14, a negative maximum value occurs at a No. 4 measurement point, and a positive maximum value occurs at a No. 10 measurement point. The horizontal component response in the direction of 90° is zero, because media in the left side and right side about the transmitting coil are completely symmetrical when a transmission direction is just along the forward direction of the heading end and then horizontal responses of the media on the two sides cancel each other. A result obtained by comparison between the vertical component response and the horizontal component response shows that the horizontal component is more sensitive to the anomaly position and is more conducive to determining the position of the anomaly.
   d. As shown in FIG. 16, a model of an anomaly with respect to sidewalls of the roadway head is established, and forward modeling is performed to obtain a vertical component response and a horizontal component response of the model (FIGS. 17(*a*) and 17(*b*)). Different time profile curves of the vertical component response (FIG. 17(*a*)) all show that a maximum value occurs in the direction of right-side 45°, which accurately reflects the position of the anomaly. As shown in FIG. 17(*b*), a horizontal component curve has two zero points where one is in the direction of left-side 45° and the other one is in the direction of right-side 45°, and the direction of right-side 45° corresponds to the position of the anomaly. When detection is performed at this angle, the media at the left and right sides of the transmitting coil are completely symmetrical, and therefore the horizontal component is zero. The direction of left-side 45° corresponds to a position where the vertical component is the lowest, and this transmission direction is completely orthogonal to the position of the anomaly. In this case, an impact of the anomaly on a TEM field is minimal, and therefore the vertical component response and the horizontal component response are both weak. The result regarding the sidewalls of the heading end is compared with the result regarding the direction right ahead of the heading end, where a change in a response result reflects a change of the position of the anomaly. Therefore, integrated interpretation of the three components provide a new solution to locating the anomaly.

2. At an underground roadway head, three-component data of the current roadway is acquired by using the receiving coils, and the data is processed and interpreted by using whole-space three-component information of the obtained model of the anomaly in front. The specific steps are as follows:
   a. As shown in FIG. 2, the transmitting coil and receiving coils are installed at the heading end of the heading face in the measured roadway. Fan shape scan is performed by changing angles of the transmitting coil and the receiving coils, and a secondary electromagnetic response to an anomaly is detected in three directions, to attain more electromagnetic responses. In FIG. 2, the directions of the arrows represent detection directions at different measurement points. By use of the fan shape, data is acquired at different angles at the roadway head, and data in three directions is acquired after transmission at each angle. That is, all coils of the whole device are rotated every 15 degrees along the fan shape, to acquire data.
   A magnetic source emission device is started to emit a primary field pulse, and a secondary field signal produced by the surrounding geological bodies is received with the receiving coils. Then, the receiving coils feed back an acquired signal to the mine host, and the mine host converts an analog signal into a digital signal and saves the digital signal.
   b. The mine host, as a TEM host, is connected to all receiving coils via cables, shows TEM secondary field information in the form of induced voltage after obtaining electromagnetic data fed back by the receiving coils, and divides data about the TEM secondary field information into two sequences which are a time sequence and an induced voltage sequence. Then, time-depth conversion is performed on the time-sequence data from the multiple receiving coils to obtain detection depth, and the induced voltage is converted into apparent resistivity to obtain a data set of [detection depth, apparent resistivity].

c. An induced voltage-time curve showing that an induced electromotive force V changes with the time t is drawn in a bi-logarithmic coordinate system according to the obtained data set of [detection depth, apparent resistivity]. Because propagation duration of an electromagnetic wave corresponds to the detection depth and the induced electromotive force reflects formation resistivity information, a variation trend of the induced voltage-time curve reflects variations of the formation resistivity with the increase of the depth.

d. The position of the transmitting coil is changed and steps a to c are repeated, to obtain multiple induced voltage-time curves.

e. It is determined, based on the multiple induced voltage-time curves, whether a plate-like anomaly exists in a coal seam ahead of the heading face, and an attitude of the plate-like anomaly in the coal seam is further determined, which is specifically as follows:

When most of the drawn induced voltage-time curves show that the electromotive force V steadily decreases to zero with the time t, it is determined that the coal seam ahead of the heading face is a uniform medium and does not contain an anomaly.

When most of the drawn induced voltage-time curves show that the electromotive force V does not steadily decrease to zero with the time t, it is determined that the anomaly exists in the coal seam ahead of the heading face; and in this case, curves of the induced voltage of a secondary field as a function of time are respectively simulated in a horizontal direction and a vertical direction. The step of simulating the curves of the induced voltage as a function of time in a horizontal direction and a vertical direction includes: first simulating the numerical values of the induced voltages to obtain data, and using logarithmic coordinates for all the data, to obtain multiple logarithmic curves of the data sets of [detection depth, apparent resistivity]; and performing apparent resistivity conversion or resistivity inversion for components of all directions, to obtain geo-electrical information in different directions.

When the drawn variation curves show that the electromotive force V decreases to zero with the time t, nonlinear attenuation occurs during the decrease, and the curves have convexity, it is determined that a vertical anomaly exists in the coal seam ahead of the heading face.

When the drawn variation curves show that the curves are ended before the electromotive force V decreasing to zero with the time t, and the curves have concavity and convexity during the decrease, it is determined that a vertical plate-like anomaly exists in the coal seam ahead of the heading face.

f. The size and position of the anomaly ahead of the heading face are determined by using the multiple induced voltage-time curves and according to a simulation result of three-component numerical values regarding anomalies at different positions, which is specifically as follows:

A vertical component result is compared with a theoretical curve, and the resistivity character of the anomaly is determined according to the amplitude of the curve, to determine its size; and a horizontal component result is compared with the theoretical curve, and the occurrence position of the anomaly is determined more accurately according to the zero position of the curve.

Apparently, the geological anomaly is determined more reliably by integrating multi-component information than by using single-component information. By measuring of three sets of data in different directions when a uniform medium or a plate-like anomaly exists, and in combination with secondary induced curves, it can be learned that that the obtained data greatly varies in different conditions. Therefore, formation resistivity information obtained through conversion or inversion based on the data also greatly varies. The finally obtained data is integrated and processed to pick out accurate information, which is a crucial feature that makes the TEM three-component technology far superior to the TEM single-component detection technique.

In general, in the following claims, the terms used should not be construed to limit the claims to the specific embodiments disclosed in the specification and the claims, but should be construed to include all possible embodiments along with the full scope of equivalents to which such claims are entitled.

What is claimed is:

1. A mine transient electromagnetic three-component detection method, wherein a transmitting coil, three sets of receiving coils, a multi-channel transient electromagnetic instrument, and a mine host are used, the multi-channel transient electromagnetic instrument being connected to the transmitting coil and the receiving coils, and the transmitting coil and the receiving coils being connected to the mine host, the method comprising:

performing forward modeling of a plurality of formations;

gathering and analyzing acquired mine transient electromagnetic three-component responses;

after the performing, gathering, and analyzing, and while measuring at an underground roadway head, acquiring transient electromagnetic three-component data of a current roadway by using the receiving coils;

comparing the acquired transient electromagnetic three-component data of the current roadway with whole-space transient electromagnetic three-component information of a front anomaly model; and processing and interpreting the acquired transient electromagnetic three-component data, to determine whether a plate-like anomaly exists ahead of a heading face, an attitude of the plate-like anomaly in a coal seam, and a size and position of the plate-like anomaly;

wherein performing forward modeling of a plurality of formations comprises:

designing a uniform whole-space model, and performing numerical simulation of a response made by the model, to obtain a curve of a secondary induced voltage as a function of time;

designing a geo-electrical model containing the plate-like anomaly, and performing numerical simulations respectively of responses made when the plate-like anomaly is placed horizontally or vertically, to obtain multiple curves of the secondary induced voltage as a function of time that correspond to the different placement manners of the plate-like anomaly; comparing response curves of a vertically placed plate-like anomaly and a horizontally placed plate-like anomaly with a uniform whole-space curve, to summarize regular pattern data;

establishing a model of an anomaly located right ahead of a heading end, to show a position of the anomaly with respect to a tunnel; and utilizing three-component acquisition and fan-shaped arrangement of measurement points at the roadway head, to obtain a vertical component response and a horizontal component response of the anomaly, wherein different time profile curves of the vertical component response all present a single peak anomaly, and the fan-shapedly arranged measurement points in the roadway experience the strongest response in a direction of 90°, this direction corresponding to a detection direction right ahead of the heading end; the horizontal component response is a negative value in directions of left-side detection angles, and is a positive value in directions of right-side detection angles; a negative maximum value occurs at a measurement point in a direction of left-side 45°, and a positive maximum value occurs at a measurement point in a direction of right-side 45°; the horizontal component response in a direction of 90° is zero, because media on left and right sides of a transmitting coil are completely symmetrical when a transmission direction is just along the forward direction of the heading end and horizontal responses of the media on the left and right sides cancel each other; a result obtained by comparison between the vertical component response and the horizontal component response shows that the horizontal component response is more sensitive to an anomaly position and is more conducive to determining the position of the anomaly; and establishing a model of an anomaly with respect to sidewalls of the roadway head, and performing forward modeling to obtain a vertical component response and a horizontal component response of the anomaly, wherein different time profile curves of the vertical component response all show that a maximum value occurs in the direction of right-side 45°, which accurately reflects the position of the anomaly; a horizontal component curve has two zero points where one is in the direction of left-side 45° and the other one is in the direction of right-side 45°, and the direction of right-side 45° corresponds to the position of the anomaly; when detection is performed at this angle, the media at the left and right sides of the transmitting coil are completely symmetrical, and therefore the horizontal component response is zero; the direction of left-side 45° corresponds to a position where the vertical component response is the lowest, and the transmission direction is orthogonal to the position of the anomaly, and an impact of the anomaly on a transient electromagnetic field is minimal, and therefore the vertical component response and the horizontal component response are both weak; and comparing a result regarding the sidewalls of the heading end with a result regarding the direction right ahead of the heading end, wherein a change in a response result reflects a change of the position of the anomaly, and therefore integrated interpretation of three component responses provides a new solution to locating the anomaly.

2. A mine transient electromagnetic three-component detection method, wherein a transmitting coil, three sets of receiving coils, a multi-channel transient electromagnetic instrument, and a mine host are used, the multi-channel transient electromagnetic instrument being connected to the transmitting coil and the receiving coils, and the transmitting coil and the receiving coils being connected to the mine host, the method comprising:

performing forward modeling of a plurality of formations;

gathering and analyzing acquired mine transient electromagnetic three-component responses;

after the performing, gathering, and analyzing, and while measuring at an underground roadway head, acquiring transient electromagnetic three-component data of a current roadway by using the receiving coils;

comparing the acquired transient electromagnetic three-component data of the current roadway with whole-space transient electromagnetic three-component information of a front anomaly model; and processing and interpreting the acquired transient electromagnetic three-component data, to determine whether a plate-like anomaly exists ahead of a heading face, an attitude of the plate-like anomaly in a coal seam, and a size and position of the plate-like anomaly;

wherein measuring at an underground roadway head comprises:

a. installing the transmitting coil and the three sets of receiving coils at a heading end of the heading face in a measured roadway, starting a magnetic source emission device to emit a primary field pulse, and receiving a secondary field signal produced by surrounding geological bodies with the three sets of receiving coils and then the receiving coils feeding back an acquired signal to the mine host; and converting an analog signal into a digital signal and saving the digital signal by the mine host, to obtain three-component information;

b. wherein the mine host is a transient electromagnetic host and connected to all receiving coils via cables, and the method further includes acquiring electromagnetic data fed back by the receiving coils, which express transient electromagnetic secondary field information in the form of induced voltage, and dividing data about the transient electromagnetic secondary field information into two sequences which are a time sequence and an induced voltage sequence; then, performing time-depth conversion on the time-sequence data from the receiving coils to obtain detection depth, and converting the induced voltage into apparent resistivity, to obtain a data set of detection depth and apparent resistivity;

c. drawing an induced voltage-time curve showing that an induced electromotive force changes with time t in a bi-logarithmic coordinate system according to the obtained data set of detection depth and apparent resistivity, wherein because propagation duration of an electromagnetic wave corresponds to the detection depth and the induced electromotive force reflects formation resistivity information, a variation trend of the induced voltage-time curve reflects variations of the formation resistivity with the increase of the depth, thereby transient electromagnetic three-component information about the measured roadway is obtained;

d. changing the position of the transmitting coil and repeating steps a to c, to obtain multiple induced voltage-time curves;

e. determining, based on the multiple induced voltage-time curves, whether a plate-like anomaly exists in a coal seam ahead of the heading face, and an attitude of the plate-like anomaly in the coal seam, which comprises:

when most of the drawn induced voltage-time curves show that the electromotive force steadily decreases to zero with the time t, determining that the coal seam ahead of the heading face is a uniform medium and does not contain an anomaly;

when most of the drawn induced voltage-time curves show that the electromotive force does not steadily decrease to zero with the time t, determining that the anomaly exists in the coal seam ahead of the heading face; and drawing variation curves of the induced voltage of a secondary field in a horizontal direction and a vertical direction as a function of time;

when the drawn variation curves show that the electromotive force decreases to zero with the time t, nonlinear attenuation occurs during the decrease, and the curves have convexity, determining that a vertical anomaly exists in the coal seam ahead of the heading face; or when the drawn variation curves show that the curves are ended before the electromotive force decreasing to zero with the time t, and the curves have concavity and convexity during the decrease, determining that a vertical plate-like anomaly exists in the coal seam ahead of the heading face; and f. determining the size and position of the anomaly ahead of the heading face by using the multiple induced voltage-time curves and according to a simulation result of three-component numerical simulation results regarding anomalies at different positions in various formation models, the determining including:

comparing a vertical component result with a theoretical curve, determining a resistivity character of the anomaly according to an amplitude of the curve, to determine the size of the anomaly; and comparing a horizontal component result with the theoretical curve, and determining an occurrence position of the anomaly according to a zero position of the curve.

3. The mine transient electromagnetic three-component detection method according to claim 2, wherein drawing the variation curves of the induced voltage in a horizontal direction and a vertical direction as a function of time comprises:

simulating numerical values of the induced voltages to obtain data, and using logarithmic coordinates for all the data, to obtain multiple logarithmic curves of the data sets of detection depth and apparent resistivity; and performing apparent resistivity conversion or resistivity inversion for components of all directions, to obtain geo-electrical information in different directions, and integrating the geo-electrical information and making integrated geological interpretation of the geological bodies.

4. A mine transient electromagnetic three-component detection method, wherein a transmitting coil, three sets of receiving coils, a multi-channel transient electromagnetic instrument, and a mine host are used, the multi-channel transient electromagnetic instrument being connected to the transmitting coil and the receiving coils, and the transmitting coil and the receiving coils being connected to the mine host, the method comprising:

performing forward modeling of a plurality of formations;

gathering and analyzing acquired mine transient electromagnetic three-component responses;

after the performing, gathering, and analyzing, and while measuring at an underground roadway head, acquiring transient electromagnetic three-component data of a current roadway by using the receiving coils;

comparing the acquired transient electromagnetic three-component data of the current roadway with whole-space transient electromagnetic three-component information of a front anomaly model; and processing and interpreting the acquired transient electromagnetic three-component data, to determine whether a plate-like anomaly exists ahead of a heading face, an attitude of the plate-like anomaly in a coal seam, and a size and position of the plate-like anomaly;

wherein the transmitting coil has 40 turns and each of the three sets of receiving coils has 60 turns; wherein the transmitting coil is disposed along an axis normal to a heading end of the heading face; wherein the three sets of receiving coils are arranged perpendicular to each other, one of the three sets of receiving coils having a same direction as the transmitting coil, and the other two sets being arranged vertically and horizontally about a tangent line of the heading end, respectively, such that response data in all directions due to a single transmission are received.

5. The mine transient electromagnetic three-component detection method according to claim 4 wherein the transmitting coil and the three sets of receiving coils are disposed at the underground roadway head, and wherein the method further comprises performing a fan shape scan by changing angles of the transmitting coil and the three sets of receiving coils, to detect a secondary electromagnetic response to the anomaly in three directions, thereby obtaining more electromagnetic responses, such that a water-rich region in the formation is determined.

* * * * *